United States Patent
Ebert et al.

(10) Patent No.: US 7,179,532 B2
(45) Date of Patent: Feb. 20, 2007

(54) COMPOSITE CERAMIC BODY AND METHOD FOR PRODUCING THE SAME

(75) Inventors: Marco Ebert, Wetter (DE); Martin Henrich, Wetzlar (DE); Dietrich Kehr, Biebertal (DE); Thorsten Scheibel, Bad Nauheim (DE); Roland Weiss, Hüttenberg (DE)

(73) Assignee: Schunk Kohlenstofftechnik GmbH, Heuchelheim (DE)

( * ) Notice: Subject to any disclaimer, the term of this patent is extended or adjusted under 35 U.S.C. 154(b) by 60 days.

(21) Appl. No.: 10/507,364

(22) PCT Filed: Mar. 24, 2003

(86) PCT No.: PCT/EP03/03041

§ 371 (c)(1),
(2), (4) Date: Oct. 19, 2004

(87) PCT Pub. No.: WO03/080538

PCT Pub. Date: Oct. 2, 2003

(65) Prior Publication Data

US 2005/0163988 A1 Jul. 28, 2005

(30) Foreign Application Priority Data

Mar. 22, 2002 (DE) ................. 102 13 013
May 16, 2002 (DE) ................. 102 22 258

(51) Int. Cl.
*B32B 9/00* (2006.01)

(52) U.S. Cl. .................................................. 428/408
(58) Field of Classification Search ............... 428/408, 428/218, 371, 446; 156/148
See application file for complete search history.

(56) References Cited

U.S. PATENT DOCUMENTS

| 4,815,572 | A | * | 3/1989 | Froberg et al. | ......... 188/251 M |
| 5,705,008 | A | * | 1/1998 | Hecht | .................. 156/148 |
| 6,254,974 | B1 | | 7/2001 | Hanzawa et al. | |
| 6,555,211 | B2 | * | 4/2003 | Moody | ................. 428/218 |
| 2001/0026868 | A1 | | 10/2001 | Hanzawa et al. | |
| 2001/0051258 | A1 | | 12/2001 | Hanzawa et al. | |

FOREIGN PATENT DOCUMENTS

| DE | 19805868 | 10/1989 |
| JP | 0003199172 | 8/1991 |

* cited by examiner

*Primary Examiner*—Jennifer C. McNeil
*Assistant Examiner*—Daniel Miller
(74) *Attorney, Agent, or Firm*—Dennison, Schultz & MacDonald

(57) ABSTRACT

A composite ceramic body includes a fiber-reinforced core region containing carbon, and a surface region containing SiC. In order to produce a composite ceramic body having good long-term behavior, the proportion of SiC contained in the body varies continuously, or essentially continuously, from inside the core region towards the surface region.

9 Claims, 1 Drawing Sheet

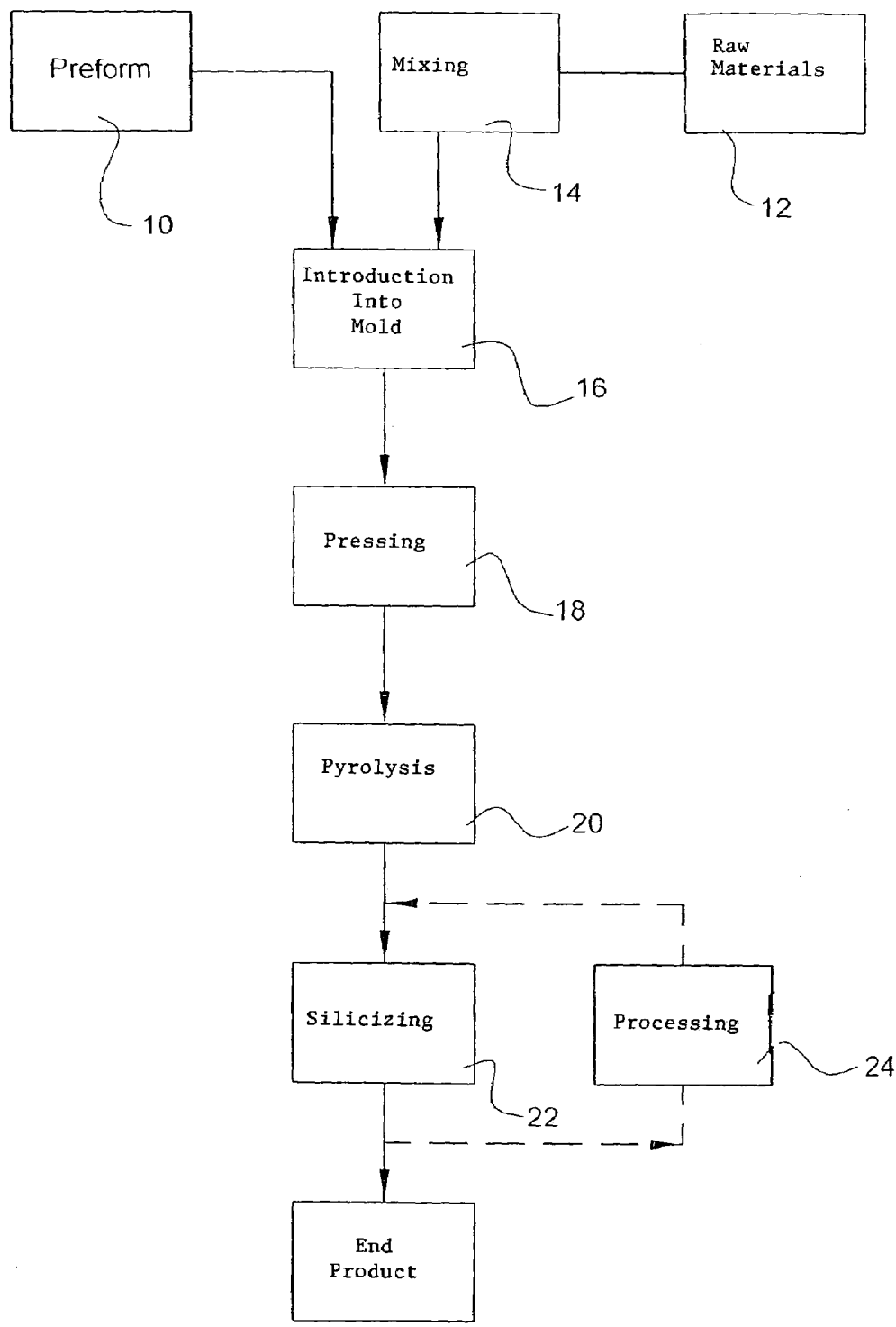

COMPOSITE CERAMIC BODY AND METHOD FOR PRODUCING THE SAME

This application is a filing under 35 USC 371 of PCT/EP2003/03041 filed Mar. 24, 2003.

BACKGROUND OF THE INVENTION

The invention concerns a composite ceramic body, especially designed for a tribological component such as a brake disk, including a fiber-reinforced carbon-containing core area as well as a SiC-containing surface area. The invention concerns also a process for producing a fiber-reinforced composite ceramic body, especially designed for a tribological component such as a brake disk, wherein a carbon body containing fibers is infiltrated with silicon, and the body is ceramicized by initiating a chemical reaction while forming SiC.

From DE 198 34 571 C2 is known a process for producing bodies from fiber-reinforced C/C preforms having a porous carbon matrix, in which the preform that is fiber-reinforced by pyrolysis is infiltrated with molten silicon. The liquid silicon can thus become embedded in the pores to produce the desired hardness in the surface layer of the CMC (ceramic matrix composite material) produced in this way.

In DE 44 38 455 C1 is described a process for producing a friction unit by infiltrating a porous carbon body with liquid silicon, wherein the porous carbon body is structured in such a way that hollow spaces and/or recesses are formed in defined interior and/or outer spaces which retain their shape and size after ceramization.

Corresponding bodies consisting of CMC materials can be used for brake disks, such as those described in DE 42 37 655 A1 or EP 071 214 B1.

From JP 0003199172 AA is known a coated carbon-fiber reinforced composite material, wherein the carbon fibers are available in a matrix, whose central part consists of carbon and whose surface consists of carbides. The transition from interior to exterior runs thus continuously or almost continuously exclusively in the surface area.

DE 198 05 868 A1 concerns a process for producing a fiber composite material, in which is used a fiber coating whose quality is increased from the exterior toward the interior to obtain a gradient material. Molding compounds of different coating quality, whose outer layers can consist entirely of silicon carbide, are introduced into a pressing die for this purpose. Furthermore, the fiber quality as well as fiber length can vary. The used reinforcing fibers themselves consist of a core having a coating of pyrocarbon and an external layer of pyrolyzable binding material that is converted into carbon by pyrolysis. An infiltration with liquid silicon can take place.

The CMC brake disks used today have an outer, almost monolithic SiC layer (surface area) in addition to a core area (core laminate). This surface layer is required due to tribological reasons. Instead, the core area should have CFC properties in order to attain if possible an almost ductile fracture failure of the overall system. According to the current state of development, the layer structure is such that a pronounced layer transition from the monolithic surface area structure to the CFC core area exists. Great differences in the mechanical and thermophysical properties arise because of this. Optically, it can be perceived in the corresponding layer system, that the monolithic layer is not only highly cracked, but has a tendency to further crack formation during use.

SUMMARY OF THE INVENTION

It is an object of the invention to further develop a composite ceramic body as well as a process for producing a composite ceramic body of the kind cited in the beginning, in such a way that the composite ceramic body has a good long-term behavior and especially a lesser tendency to form cracks on the surface. At the same time, however, the advantages of the known separate layer construction should largely be preserved with respect to the abrasion-resistant outer monolithic SiC layer and the ductility of the core area.

The object is attained in accordance with the invention with a composite ceramic body of the previously described type basically in that the composite body consists of a fiber-reinforced carbon body, the fibers in the core area are longer than in the surface area, the fibers in the surface area have a lower filament count than in the core area and/or the carbon body has a greater porosity in the surface area than in the core area, and the composite ceramic body contains SiC in such a way that inside the core area, and continuing into the surface area, the SiC proportion changes constantly or essentially constantly. In particular, the composite ceramic body is steadily graded in relation to the SiC portion in such a way that the core area has ductile properties and the surface area has monolithic SiC layer or Si/SiC layer properties.

The surface area should thus have essentially the following proportions approx. 20% by weight up to approx. 100% by weight of SiC, approx. 0% by weight up to approx. 30% by weight of free Si, approx. 0% by weight up to approx. 80% by weight of carbon, approx. 0% by weight up to approx. 20% by weight of $Si_3N_4$, and/or approx. 0% by weight up to approx. 20% by weight of $B_4C$.

In contrast, the core area should have proportions of:

approx. 0% by weight up to approx. 70% by weight of SiC, approx. 0% by weight up to approx. 30% by weight of free silicon, approx. 20% by weight up to approx. 100% by weight of carbon, and/or approx. 0% by weight up to approx. 20% by weight of $B_4C$.

The composite ceramic body should in particular contain carbon fibers and/or graphite fibers and/or SiC fibers as reinforcing fibers when using a fabric, a clutch, a felt, a fleece, or a paper as carbon-containing starting material, short fibers within the length range from approx. 1 mm to approx. 60 mm.

Preforms containing carbon or to which a carbon donor has been added can also be used for producing the composite ceramic, wherein the preform is impregnated with a pyrolyzable binding agent, wherein three-dimensional or multi-dimensional preforms and preforms in the TFP technique (Taylored Fiber Placement) can be used for the RTM process (Resin Transfer Molding) or pressing process. As "multidimensional" are meant preforms with more than 3 reinforcement directions.

It is provided in a further embodiment of the invention that the composite ceramic body is produced by pyrolizing and ceramicizing a fiber-containing carbon body, whereby the fibers in the core area are longer than in the surface area.

Furthermore, the fibers with less filament count can be in the surface area rather than in the core area.

It can also be provided that the carbon body has an open porosity, so that the pore volume is greater in the surface area than in the core area. The carbon body has especially additives that have different carbon yields, whereas the carbon yields in the surface area are less than in the core area. Thermoplastics such as polyethylene or propylene, or elastomers such as silicon rubber, or duromers such as low cured epoxide resins or natural substances such as sawdust are considered as additives. An adjustment of the porosity can also take place via the grain size distribution of the additives used, such as carbons, graphite, SiC powder, Si powder, and $B_4C$ powder.

A composite ceramic is made available by the teaching of the invention, whose SiC content increases in flow from the core area to the surface area. A grading of the SiC content or Si/SiC content with the consequence that the discontinuous transition is prevented according to the state of the art between the core area, which has ductile properties, and the surface area, which preferably possesses monolithic SiC layer properties. In this way can be achieved a lesser tendency toward crack formation on the surface, a better long-term behavior, and consequently also a better life performance. The configuration of the composite ceramic is such, that the transition from the monolithic or almost monolithic SiC surface structure is realized in several steps as a CFC-dominated CMC core structure. The materials composition changes as a consequence from a monolithic or almost monolithic composition to a fiber-reinforced composite material.

A process for producing a composite ceramic body, wherein a fiber-containing carbon body with any optionally desired porosity is made available, the carbon body is infiltrated with silicon, and the body is ceramicized by initiating a chemical reaction while forming SiC, is characterized in that, prior to the infiltration of the carbon body with Si, the latter is structured through various fiber lengths and/or fibers of different filament count and/or selective adjustment of the porosity, in such a way that the SiC content of the composite ceramic body increases constantly or essentially constantly starting from the interior area of the core area and continuing into the surface area.

The carbon body is structured in accordance with the invention of different fiber lengths and/or fibers of different filament count and/or with a specific adjustment of the porosity.

The porosity can be adjusted with additives with different carbon yields. Additives can also be used whose carbon yield is less in the surface area than in the core area. The porosity can likewise be adjusted to the desired extent by the grain size distribution of the additives, so that an almost monolithic SiC structure results in the surface area and a CFC-dominant material results in the core area.

Equal possibilities are offered by the selectively adjustable process parameters in connection with the pyrolysis.

Through the teaching of the invention is made available a composite ceramic, which can be used especially for brake disks, brake linings, clutches, clutch disks, bearing materials, sealing and slip rings, and charging aids for furnace and facility construction. The composite ceramic has consequently a layer structure that is such that the SiC content increases almost flowingly from interior to exterior. A corresponding grading can also be adjusted in relation to $B_4C$ or $Si_3N_4$.

Further details, advantages and features of the invention become apparent, not only from the claims, the features which can be inferred from them, but also from the following description of examples.

EXAMPLE 1

Production of a Clutch Disk with Graded Structure:

Use of a fabric with low surface weight wherein 30 individual layers are utilized.

The outer 4 fabric layers are applied using a spray coating with wood flour and a phenol resin binder and ethanol. The proportion by weight of wood flour, phenol resin binder, and ethanol is 20% with respect the fiber surface weight. The next 4 fabric layers are analogously provided with a weight proportion of 15%. The next 4 layers are provided with a proportion by weight of 10%, the next 4 layers with a proportion by weight of 7%, the next 4 layers with a proportion by weight of 3%. The inner 10 layers are not treated.

All the layers are inserted into an RTM die in accordance with the grading sequence, infiltrated with phenol resin, and hardened. Subsequently took place the carbonization. A ring of this semifinished material is processed with allowance and subsequently silicized. The silicized component has an almost flowing grading (almost flowingly changing SiC proportion) after this process, wherein the surface area has the following composition: 8% Si, 75% SiC and 17% C, while the interior area is composed as follows: 3% Si, 33% SiC and 64% C.

Abrupt transitions are no longer apparent and the crack formation in the surface area is largely prevented.

EXAMPLE 2

Production of a Brake Lining for Industrial Applications with Graded Structure:

Carbon fibers having lengths of 3, 6, 9 and 12 mm are used for the production. The fibers are treated over their respective lengths with carbon-containing filler, a phenol resin, and ethanol, and are processed into a compound using a mixture preparation. The mixture has the following composition: 40% by vol. of C fiber, 30% by vol. of carbon filler, and 30% by volume of phenol resin.

The dried compound is introduced to produce the lining by means of a filling device in the following sequence into the press die (depending on the application and fastening of lining, the grading can be symmetrical or unsymmetrical with respect to the central axis):

10% by weight with 3 mm C fibers
5% by weight with a 50:50 mixture of 3 mm and 6 mm C fibers
5% by weight with 6 mm C fibers
5% by weight 50:50 mixture of 6 mm and 9 mm C fibers
5% by weight with 9 mm C fibers
5% by weight 50:50 mixture of 9 mm and 12 mm C fibers
15% by weight with 12 mm C fibers
5% by weight with 50:50 mixture of 9 mm and 12 mm C fibers
5% by weight with 9 mm C fibers
5% by weight with 50:50 mixture of 6 mm and 9 mm C fibers
5% by weight with 6 mm C fibers
5% by weight with 50:50 mixture of 3 mm and 6 mm C fibers
10% by weight with 3 mm C fibers The following grading could be established following carbonizing and silicizing.

The area near the surface consists of 85% SiC, 4% Si and 11% C, while the interior area consists of 38% SiC, 3% Si and 59% C. The produced grading is flowing and the lining shows very few tears in the surface area after production.

Further details, advantages and features become apparent from the following description.

BRIEF DESCRIPTION OF THE DRAWING

The single figure depicts in a purely schematic way the process of the invention for producing a composite ceramic body especially designed for a tribological component.

DESCRIPTION OF THE PREFERRED EMBODIMENTS

As described in the drawing figure, one or several preforms 10 directly, or raw materials 12 such as carbon fibers with a carbon-containing filler or binding agent and, for example, ethanol can be introduced into a mold such as an RTM die following mixing 14 (step 16). The preform or preforms, which also include fabric layers, can be impregnated with a binding agent before or after they are introduced into the mold. It is also possible to add further additives. Furthermore, the raw materials are arranged or mixed with additives so that an almost flowing, multistage change of the SiC content results in the ceramic body to be produced in such a way that the outer area has the properties of a monolithic or an approximately monolithic SiC layer, but the core has a CFC-dominated CMC structure.

In the following process step 18 occurs the pressing into a desired geometrical shape, whereupon in a process step 20 the body, which has been removed from the mold, is pyrolyzed, that is, carbonized or graphitized.

The carbonization can take place within a temperature range between 500° C. and 1450° C., in particular between 900° C. and 1200° C., and the graphitizing can occur within a temperature range between 1500° C. and 3000° C., in particular between 1800° C. and 2500° C. Subsequently the carbon body is silicized by introducing the carbon body into a container filled with silicon and exposing the latter over a period of, for example, 1 to 7 hours, to a temperature within the range of approx. 1450° C. to 1700° C. (process step 22). The composite ceramic body produced in this way can then be optionally processed (step 24) to attain a desired final geometrical shape. As an alternative, or in addition, there exists the possibility of processing the body before silicizing.

The silicizing can also be conducted as follows in deviation from the previously described process. This is why a pressure-vacuum process is possible in a silicon melt at a temperature of approx. 1450° C. to approx. 2000° C. A slurry process with silicon-containing slurries that are applied beforehand is also possible. A wick or capillary process can also be used, in which porous wicks stand in contact with the carbon body and silicon-filled container.

The correspondingly produced composite ceramic bodies have the advantage that an almost flowingly changing SiC content can be achieved from the core area in the direction of the surface area, wherein the core area has the properties of a CFC-dominant material and the surface area has those of a monolithic or constant monolithic SiC structure.

The previously explained steps, and in particular the process steps that can be inferred from the examples, justify the need of a patent protection that is separate from preceding steps. The indicated numerical values are also intended purely as examples and are not restrictive with respect to the protection.

The invention claim is:

1. A composite ceramic body comprising carbon-containing fibers and SiC, and having a core area and a surface area, wherein the body has a content of SiC which decreases in a substantially continuous manner from the surface area to the core area, and the fibers in the surface area have a lower filament count than the fibers in the core area.

2. The composite ceramic body of claim 1, wherein the composite ceramic body is flowingly graded with respect to the SiC proportion such that the core area has ductile properties and the surface area has monolithic SiC layer or Si/SiC layer properties.

3. The composite ceramic body of claim 1, wherein the body contains additives with different carbon yields for adjusting porosity.

4. The composite ceramic body of claim 3, wherein the additives are thermoplastics with different carbon yields.

5. The composite ceramic body of claim 3, wherein the additives are selected from the group consisting of thermoplastics, elastomers, duromers, natural substances and mixtures thereof.

6. The composite ceramic body of claim 3, wherein the porosity is adjusted via grain size distribution of additives selected from the group consisting of carbons, graphites, SiC powder, $B_4C$ powder and mixtures thereof.

7. The composite ceramic body of claim 1, wherein the surface area contains between about 20% by weight and up to about 100% by weight of SiC, between about 0% by weight and about 30% by weight of free Si, between about 0% by weight and about 80% by weight of carbon, between about 0% by weight and up to about 20% by weight of $Si_3N_4$, and between about 0% by weight and up to about 20% by weight of $B_4C$.

8. The composite ceramic body of claim 1, wherein the core area of the composite ceramic body contains between about 0% by weight and up to about 20% by weight of SiC, about 0% by weight and up to about 30% by weight of free Si, between about 20% by weight and up to about 100% by weight of carbon, and about 0% by weight and up to about 20% by weight of $B_4C$.

9. A brake disk comprising the composite ceramic body of claim 1.

* * * * *